US012760220B2

(12) United States Patent
Lüchinger

(10) Patent No.: US 12,760,220 B2
(45) Date of Patent: Oct. 13, 2026

(54) SOLID POLYMER COMPOSITION, A SELF-SUPPORTING FILM AND A LIGHT EMITTING DEVICE

(71) Applicant: Avantama AG, Stäfa (CH)

(72) Inventor: Norman Albert Lüchinger, Meilen (CH)

(73) Assignee: AVANTAMA AG, Stäfa (CH)

( * ) Notice: Subject to any disclaimer, the term of this patent is extended or adjusted under 35 U.S.C. 154(b) by 1203 days.

(21) Appl. No.: 17/773,121

(22) PCT Filed: May 28, 2021

(86) PCT No.: PCT/EP2021/064377
§ 371 (c)(1),
(2) Date: Apr. 29, 2022

(87) PCT Pub. No.: WO2021/239962
PCT Pub. Date: Dec. 2, 2021

(65) Prior Publication Data

US 2022/0396730 A1 Dec. 15, 2022

(30) Foreign Application Priority Data

May 29, 2020 (EP) .................................... 20177385

(51) Int. Cl.
*C09K 11/06* (2006.01)
*C09K 11/61* (2006.01)
*C09K 11/66* (2006.01)

(52) U.S. Cl.
CPC ............ *C09K 11/616* (2013.01); *C09K 11/06* (2013.01); *C09K 11/665* (2013.01)

(58) Field of Classification Search
None
See application file for complete search history.

(56) References Cited

U.S. PATENT DOCUMENTS

2015/0361337 A1* 12/2015 Murphy ............... C09K 11/617 252/301.4 F
2017/0153382 A1 6/2017 Wang et al.
2018/0027384 A1 1/2018 Sundaram et al.
2018/0348577 A1* 12/2018 Pousthomis ...... G02F 1/133617

FOREIGN PATENT DOCUMENTS

EP 3282000 A1 2/2018
EP 3296378 A1 3/2018
WO 2017108568 A1 6/2017
WO 2017195062 A1 11/2017

OTHER PUBLICATIONS

Xu et al., "Convenient and Large-Scale Synthesis of High-Quality, All-Inorganic Lead Halide Perovskite Nanocrystals for White Light-Emitting Diodes," 2019, Chemical Engineering Journal 364, pp. 20-27, DOI: 10.1016/j.cej.2019.01.152.
Wang Wei et al., "Perovskite Quantum Dot/Powder Phosphor Converted White Light LEDs with Wide Color Gamut," Chinese Journal of Luminescence 39; DOI: 10.3788/fgxb20183905.0627.
International Search Report and Written Opinion in corresponding International Application No. PCT/EP2021/064377 mailed Jul. 19, 2021.
Tongtong Xuan et al: "Super-Hydrophobic Cesium Lead Halide Perovskite Quantum Dot-Polymer Composites with High Stability and Luminescent Efficiency for Wide Color Gamut White Light-Emitting Diodes", Chemistry of Materials, vol. 31, No. 3, Feb. 12, 2019 (Feb. 12, 2019), pp. 1042-1047.

* cited by examiner

*Primary Examiner* — Tanisha Diggs
(74) *Attorney, Agent, or Firm* — RENNER, OTTO, BOISSELLE & SKLAR, LLP

(57) ABSTRACT

The invention refers in a first aspect to a solid polymer composition (100) comprising green luminescent crystals (1), non-perovskite red phosphor particles, and a polymer (3). The polymer (3) has a molar ratio of the sum of (oxygen+nitrogen) to carbon z, wherein $z \leq 0.9$, $z \leq 0.75$ in particular $z \leq 0.4$, in particular $z \leq 0.3$, in particular $z \leq 0.25$. A second aspect of the invention refers to a self-supporting film comprising the solid polymer composition (100) of the first aspect. A third aspect of the invention refers to a light emitting device comprising either the solid polymer composition (100) according to the first aspect of the invention or the self-supporting film according to the second aspect of the invention.

15 Claims, 2 Drawing Sheets

SOLID POLYMER COMPOSITION, A SELF-SUPPORTING FILM AND A LIGHT EMITTING DEVICE

This application is a national phase of International Application No. PCT/EP2021/064377 filed May 28, 2021, which claims priority to European Patent Application No. 20177385.0 filed May 29, 2020, each of which is hereby incorporated herein by reference in its entirety.

TECHNICAL FIELD

The invention relates in a first aspect to a solid polymer composition and in a second aspect to a self-supporting film as well as in a third aspect to a light emitting device.

BACKGROUND ART

State-of-the-art liquid crystal displays (LCD) or display components comprise luminescent crystal (quantum dot) based components. In particular, a backlight component of such a LCD might comprise a RGB backlight consisting of a red, a blue and a green light. Today, typically luminescent crystals (quantum dots) are used to produce the backlight colours of such a backlight component.

The manufacturing of such components faces various challenges. One challenge is the embedding of the luminescent crystals into the component. Due to the different chemical properties of the luminescent crystals, there might be incompatibilities between the various embedded materials comprising the luminescent crystals or even between luminescent crystals embedded within the same material. Such incompatibilities might lead to degradation of the materials in the display components and therefore the lifetime of such a display might be affected.

Document US 2017/0153382 A1 discloses a quantum dot composite material, a manufacturing method and an application thereof. The quantum dot composite material includes an all-inorganic perovskite quantum dot and a modification protection on a surface of the all-inorganic perovskite quantum dot.

Document Tongtong Xuan et al. "Super-Hydrophobic Cesium Lead Halide Perovskite Quantum Dot-Polymer Composites with High Stability and Luminescent Efficiency for Wide Color Gamut White Light-Emitting Diodes", Chemistry of Materials, vol. 31, no. 3, 12 Feb. 2019, pages 1042-1047. The document discloses a composite strategy to enhance the stability of water sensitive $CsPbBr_3$ quantum dots by embedding the QDs into the super-hydrophobic porous organic polymer frameworks.

Document Sijbom H. F. et al. "Luminescent Behavior of the $K_2SiF_6:Mn^{4+}$ Red Phosphor at High Fluxes and at the Microscopic Level", ECS Journal of Solid State Science and Technology, 5(1), R3040-R3048 (2016). The document discloses the manufacturing of red non-perovskite phosphor particles.

DISCLOSURE OF THE INVENTION

The problem to be solved by the present invention is to provide a material composition that overcomes the disadvantages of the prior art.

The present invention will be described in detail below. Unless otherwise stated, the following definitions shall apply in this specification:

The terms "a", "an" "the" and similar terms used in the context of the present invention are to be construed to cover both the singular and plural unless otherwise indicated herein or clearly contradicted by the context. The term "containing" shall include all, "comprising", "essentially consisting of" and "consisting of". Percentages are given as weight-%, unless otherwise indicated herein or clearly contradicted by the context. "Independently" means that one substituent/ion may be selected from one of the named substituents/ions or may be a combination of more than one of the above.

The term "phosphor" is known in the field and relates to materials that exhibits the phenomenon of luminescence, specifically fluorescent materials. Accordingly, a red phosphor is a material showing luminescence in the range of 610-650 nm, e.g. centered around 630 nm. Accordingly, a green phosphor is a material showing luminescence in the range of 500-550 nm, e.g. centered around 530 nm. Typically, phosphors are inorganic particles. The term "phosphor particles" means particles of the phosphor as described above. The particles can be single crystalline or polycrystalline. In the context of the present invention, the term particles refers to primary particles, not secondary particles (e.g. agglomerates or conglomerates of primary particles)

The term "luminescent crystal" (LC) is known in the field and relates to crystals of 3-100 nm, made of semiconductor materials. The term comprises quantum dots, typically in the range of 2-15 nm and nanocrystals, typically in the range of more than 15 nm and up to 100 nm (preferably up to 50 nm). Preferably, luminescent crystals are approximately isometric (such as spherical or cubic). Particles are considered approximately isometric, in case the aspect ratio (longest: shortest direction) of all 3 orthogonal dimensions is 1-2. Accordingly, an assembly of LCs preferably contains 50-100% (n/n), preferably 66-100% (n/n) much preferably 75-100% (n/n) isometric nanocrystals.

LCs show, as the term indicates, luminescence. In the context of the present invention the term luminescent crystal includes both, single crystals and polycrystalline particles. In the latter case, one particle may be composed of several crystal domains (grains), connected by crystalline or amorphous phase boundaries. A luminescent crystal is a semiconducting material which exhibits a direct bandgap (typically in the range 1.1-3.8 eV, more typically 1.4-3.5 eV, even more typically 1.7-3.2 eV). Upon illumination with electromagnetic radiation equal or higher than the bandgap, the valence band electron is excited to the conduction band leaving an electron hole in the valence band. The formed exciton (electron-electron hole pair) then radiatively recombines in the form of photoluminescence, with maximum intensity centered around the LC bandgap value and exhibiting photoluminescence quantum yield of at least 1%. In contact with external electron and electron hole sources LC could exhibit electroluminescence.

The term "perovskite crystals" is known and particularly includes crystalline compounds of the perovskite structure. Such perovskite structures are known per se and described as cubic, pseudocubic, tetragonal or orthorhombic crystals of general formula M1M2X3, where M1 are cations of coordination number 12 (cuboctaeder) and M2 are cations of coordination number 6 (octaeder) and X are anions in cubic, pseudocubic, tetragonal or orthorhombic positions of the lattice. In these structures, selected cations or anions may be replaced by other ions (stochastic or regularly up to 30 atom-%), thereby resulting in doped perovskites or nonstochiometric perovskites, still maintaining its original crystalline structure. The manufacturing of such luminescent crystals is known, e.g. from WO2018 028869.

The term "polymer" is known and includes organic synthetic materials comprising repeating units ("monomers"). The term polymers includes homo-polymers and co-polymers. Further, cross-linked polymers and non-crosslinked polymers are included. Depending on the context, the term polymer shall include its monomers and oligomers. Polymers include silicon based and non-silicon based polymers, by way of example: silicon based polymers such as silicone polymers, as well as non-silicon based polymers such as acrylate polymers, carbonate polymers, sulfone polymers, epoxy polymers, vinyl polymers, urethane polymers, imide polymers, ester polymers, furane polymers, melamine polymers, styrene polymers, norbornene polymers and cyclic olefin copolymers. Polymers may include, as conventional in the field, other materials such as polymerization initiators, stabilizers, solvents, scattering particles.

Polymers may be further characterized by physical parameters, such as polarity, glass transition temperature Tg, Young's modulus and light transmittance.

Polarity (z): The ratio of heteroatoms (i.e. atoms other than carbon and hydrogen) to carbon (n/n) is an indicator for polymer polarity. In the context of this invention, polymers with $0.4<z<0.9$ are considered polar, while polymers with $z\leq 0.4$ are considered apolar.

Glass transition temperature: (Tg) is a well-established parameter in the field of polymers; it describes the temperature where an amorphous or semi-crystalline polymer changes from a glassy (hard) state to a more pliable, compliant or rubbery state. Polymers with high Tg are considered "hard", while polymers with low Tg are considered "soft". On a molecular level, Tg is not a discrete thermodynamic transition, but a temperature range over which the mobility of the polymer chains increase significantly. The convention, however, is to report a single temperature defined as the mid-point of the temperature range, bounded by the tangents to the two flat regions of the heat flow curve of the DSC measurement. Tg may be determined according to DIN EN ISO 11357-2 or ASTM E1356 using DSC. This method is particularly suitable if the polymer is present in the form of bulk material. Alternatively, Tg may be deter-mined by measuring temperature-dependent micro- or nanohardness with micro- or nanoindentation according to ISO 14577-1 or ASTM E2546-15. This method is suited for luminescent components and lighting devices as disclosed herein. Suitable analytical equipment is available as MHT (Anton Paar), Hysitron TI Premier (Bruker) or Nano Indenter G200 (Keysight Technologies). Data obtained by temperature controlled micro- and nanoindentation can be converted to Tg. Typically, the plastic deformation work or Young's modulus or hardness is measured as a function of temperature and Tg is the temperature where these parameters change significantly.

Young's modulus or Young modulus or Elasticity modulus is a mechanical property that measures the stiffness of a solid material. It defines the relationship between stress (force per unit area) and strain (proportional deformation) in a material in the linear elasticity regime of a uniaxial deformation.

Transmittance: Typically, polymers used in the context of this invention are light transmissive for visible light, i.e. non-opaque for allowing light emitted by the luminescent crystals, and possible light of a light source used for exciting the luminescent crystals to pass. Light transmittance may be determined by white light interferometry or UV-Vis spectrometry.

According to the present invention, the above described problem is solved by a first aspect of the invention, a solid polymer composition comprising a first class of luminescent materials, selected from green luminescent perovskite crystals, a second class of luminescent materials, selected from non-perovskite red phosphor particles and a polymer. Suitable green luminescent perovskite crystals are selected from compounds of formula (I):

$$[M^1A^1]_aM^2_bX_c \qquad \text{(I), wherein:}$$

- $A^1$ represents one or more organic cations, preferably formamidinium (FA),
- $M^1$ represents one or more alkaline metals, in particular Cs,
- $M^2$ represents one or more metals other than M1, in particular Pb,
- X represents one or more anions selected from the group consisting of halides, pseudohalides and sulfides, in particular Br,
- a represents 1-4,
- b represents 1-2,
- c represents 3-9, and
  wherein either $M^1$, or $A^1$, or $M^1$ and $A^1$ being present.

In particular, formula (I) describes luminescent crystals where X represents halides or pseudohalides, e.g. Br, Cl, CN, in particular Br.

In particular, formula (I) describes luminescent crystals wherein $M^2$ represents Pb.

In particular, formula (I) describes luminescent crystals, wherein $A^1$ represents FA (formamidinium) and $M^1$ is not present.

Suitable non-perovskite red phosphor particles are Mn+4 doped phosphor particles are selected from compounds of formula (II):

$$[A]_x[MF_y]:Mn^{4+} \qquad \text{(II), wherein:}$$

- A represents Li, Na, K, Rb, Cs or a combination thereof, in particular K,
- M represents Si, Ge, Sn, Ti, Zr, Al, Ga, In, Sc, Y, La, Nb, Ta, Bi, Gd, or a combination thereof, in particular Si
- x represents an absolute value of the charge of the [MFy] ion, in particular 2; and
- Y represents 5, 6 or 7, in particular 6.

The polymer has a molar ratio of the sum of (oxygen+nitrogen) to carbon z, wherein $z\leq 0.9$, $z\leq 0.75$ in particular $z\leq 0.4$, in particular $z\leq 0.3$, in particular $z\leq 0.25$.

A solid polymer composition comprising specific green luminescent crystals, specific non-perovskite red Mn4+-doped phosphors and specific polymer matrices, enables high stability of the luminescent crystals and the non-perovskite red phosphors when used in light emitting devices, in particular in LCD displays.

In particular, formula (I) describes perovskite luminescent crystals which, upon absorption of blue light emit light of a wavelength in the green light spectrum between 500 nm and 550 nm, in particular centred around 527 nm.

In an advantageous embodiment, the green luminescent perovskite crystals are in particular green luminescent perovskite crystals of the formula (I'):

$$FAPbBr_3 \qquad \text{(I').}$$

In a further advantageous embodiment of the invention, the non-perovskite red phosphor particles are non-perovskite red phosphor Mn+4 doped phosphor particles of formula (II'):

$$K2SiF6:Mn4+ \qquad \text{(II').}$$

In an advantageous embodiment of the solid polymer composition, the green luminescent perovskite crystals and the non-perovskite red phosphor particles are embedded into the polymer.

In a further advantageous embodiment of the solid polymer composition, the green luminescent perovskite crystals and the non-perovksite red phosphor particles are embedded in the polymer without an encapsulation This means in particular that the perovskite crystals and the non-perovksite red phosphor particles do not need any encapsulation (such as particle surface protection or shelling) to be embedded into the polymer.

In particular, the green luminescent perovskite crystals and the non-perovskite red phosphor particles are both distributed within the polymer and in particular are essentially distributed within the polymer such that they do not exceed a surface of the polymer.

In a further advantageous embodiment of the invention, the polymer has a molar ratio of the sum of (oxygen+nitrogen+sulphur+phosphorous+fluorine+chlorine+bromine+iodine) to carbon $z<0.9$, preferably $z<0.4$, preferably $z<0.3$, most preferably $z<0.25$.

In a further advantageous embodiment of the solid polymer composition, the difference in concentration $\Delta c_{Mn}$ of Mn between the center of each non-perovskite red phosphor particle and an area 100 nm below the particle surface is $\Delta c_{Mn} \leq 50\%$, in particular $\Delta c_{Mn} \leq 20\%$.

In particular, such concentration differences $\Delta c_{Mn}$ can be determined by using scanning electron microscopy (SEM) equipped with energy dispersive X-ray spectroscopy (EDX) on a cross-section of a single phosphor particle. Such cross-section of a single phosphor particle can be prepared by focused ion beam (FIB).

In particular, non-perovskite red phosphor particles with said concentration difference $\Delta c_{Mn}$ do not exhibit a protection layer or shell, in particular do not require a inorganic protection layer or shell on the surface for stabilization.

In particular, since no protection layer or shell is necessary, the processing steps for the manufacturing of the non-perovskite red phosphor particles can be reduced.

The center of the particle refers in particular to a center area of the particle, in particular a core or core region of the particle.

In contrast to known red phosphor particles, the non-perovskite red phosphor particles as introduced in this invention do advantageously not comprise an inorganic protection layer on the surface. In particular, the non-perovskite red phosphor particles do not comprise a metaloxide or $K_2SiF_6$ protection layer.

For an advantageous embodiment, the omission of the inorganic protection layer might be implemented as following, wherein the suggested embodiments might be independent from each other or might be combined:

- Advantageously, the non-perovskite red phosphor particles are free of an inorganic surface coating. In particular, the particles are free of inorganic surface coating with a composition that differs from the composition of a core of each non-perovskite red phosphor particle. Free of an inorganice surface coating means in particular that there is essentially no such coating present on the respective surface.
- Advantageously, each non-perovskite red phosphor particles exhibits a homogenous distribution of Mn+4 from the particle center to the particle surface. Therefore, in particular, each non-perovskite red phosphor particular has an essentially homogenous concentration $c_{Mn}$ of Mn over the whole volume of the respective particle.
- Advantageously, the non-perovskite red phosphor particles have a Manganese (Mn)-concentration $c_{Mn}$ of $c_{Mn} \geq 6$ mol %, in particular of $c_{Mn} \geq 9$ mol %, in particular of $c_{Mn} \geq 11$ mol %.

Without being bound to theory, it is believed that, in contrast to known non-perovskite red phosphor particles that need an inorganic layer for stabilization, the polymer matrix here provides the stability.

In a further advantageous embodiment of the invention, the green luminescent perovskite crystals are of size between 3 nm and 100 nm. In particular, the size of perovskite crystals can be determined by transmission electron microscopy.

In a further advantageous embodiment of the invention, the non-perovskite red phosphor particles have a Mn-concentration $c_M$ of $6 \leq c_M \leq 15$ mol %, preferably $10 \leq c_M \leq 14$ mol %, most preferably $11 \leq c_M \leq 13$ mol %.

Advantageously, the non-perovskite red phosphor particles have a particle size (volume-weighted average) $s_p$ of $s_p \leq 10$ μm, advantageously of $s_p \leq 5$ μm, advantageously of $s_p \leq 2$ μm, advantageously of $s_p \leq 1$ μm, advantageously of $s_p \geq 50$ nm, advantageously of $s_p \geq 100$ nm, advantageously of $s_p \geq 200$ nm.

Further advantageously, the non-perovskite red phosphor particles have a particle size (volume-weighted average) of 200 nm$\leq s_p \leq 10$ μm, very particular 200 nm$\leq s_p \leq 5$ μm.

Particle sizes are measured by means of standard characterization methods, e.g. scanning electron microscopy (SEM).

In particular, the combination of the specific size of the green luminescent perovskite crystals of 3 nm to 100 and the non-perovskite red phosphor particles of $s_p \leq 10$ μm, advantageously of $s_p \leq 5$ μm, might result in an advantageous embodiment. If particles with these respective sizes are embedded in the polymer, the amount of particles in the polymer can be optimized due to the advantageous light particle interaction in this size range.

In an advantageous embodiment, the solid polymer composition comprises an acrylate, very advantageously the polymer comprises a cyclic aliphatic acrylate.

In another advantageous embodiment, the solid polymer comprises a multi-functional acrylate.

In another advantageous embodiment, the solid polymer is cross-linked. Cross linking may be achieved as known in the field, e.g. by adding cross-linking agents or multivalent monomers.

An advantageous solid polymer composition has a glass transition temperature $T_g$ of $T_g \leq 120°$ C., advantageously of $T_g \leq 100°$ C., advantageously of $T_g \leq 80°$ C., advantageously of $T_g \leq 70°$ C. Each $T_g$ is measured according to DIN EN ISO 11357-2:2014-07 during the second heating cycle and applying a heating rate of 20K/min, starting at −90° C. up to 250° C.

In a further advantageous embodiment of the invention, the solid polymer composition comprises scattering particles selected from the group consisting of metal oxide particles and polymer particles. Advantageously, the particles are metal oxide particles, preferably selected from the group consisting of $TiO_2$, $ZrO_2$, $Al_2O_3$ and organopolysiloxanes.

In a further advantageous embodiment the solid polymer is semicrystalline.

In a further advantageous embodiment the solid polymer has a melting temperature $T_p$ of $T_p<140°$ C., preferably $T_p<120°$ C., most preferably $T_p<100°$ C.

The inventive solid polymer compositions may be obtained in analogy to known methods using the starting materials of formula (I), formula (II) and monomers/oligomers of the respective polymer. The invention thus provides for a method of manufacturing a solid polymer composition comprising the steps of (a) combining compound of formula (I), compound of formula (II), monomer and/or oligomer of the polymer, optionally diluent, optionally scattering particles, optionally catalyst or other additives, to thereby obtain a first dispersion;

(b) optionally removing the diluent to thereby obtain an ink;

(d) curing said ink to thereby obtain the inventive solid polymer composition.

A second aspect of the invention refers to a self-supporting film that comprises a solid polymer composition according to the first aspect of the invention.

Advantageously, the self-supporting film emits green and red light in response to excitation by light of a wavelength shorter than the emitted green light.

Advantageously, the solid polymer composition is sandwiched between two barrier layers.

In a further advantageous embodiment, such a self-supporting film can have a thickness $t_{ssf}$ of $0.001 \leq t_{ssf} \leq 10$ mm, preferably of $0.01 \leq t_{ssf} \leq 0.5$ mm.

In a further advantageous embodiment, the solid polymer is sandwiched between two barrier layers. In particular, such sandwich arrangement refers to an arrangement in a horizontal direction with a barrier layer, the polymer and another barrier layer. The two barrier layers of the sandwich structure can be made of the same barrier layer material or of different barrier layer materials.

The technical effect of the barrier layers is to improve the stability of the luminescent perovskite crystals, in particular against oxygen or humidity.

In particular, such barrier layers are known in the field; typically comprising a material/a combination of materials with low water vapour transmission rate (WVTR) and/or low oxygen transmission rate (OTR). By selecting such materials, the degradation of the LCs in the component in response to being exposed to water vapor and/or oxygen is reduced or even avoided. Barrier layers or films preferably have a WVTR<10 (g)/(m^2*day) at a temperature of 40° C./90% r.h. and atmospheric pressure, more preferably less than 1 (g)/(m^2*day), and most preferably less than 0.1 (g)/(m^2*day).

In an advantageous embodiment, the barrier film may be permeable for oxygen. In another advantageous embodiment, the barrier film is impermeable for oxygen and has an OTR (oxygen transmission rate)<10 (mL)/(m^2*day) at a temperature of 23° C./90% r.h. and atmospheric pressure, more preferably <1 (mL)/(m^2*day), most preferably <0.1 (mL)/(m^2*day).

In one embodiment, the barrier film is transmissive for light, i.e. transmittance for visible light >80%, preferably >85%, most preferably >90%.

Suitable barrier films may be present in the form of a single layer. Such barrier films are known in the field and contain glass, ceramics, metal oxides and polymers. Suitable polymers may be selected from the group consisting of polyvinylidene chlorides (PVdC), cyclic olefin copolymer (COC), ethylene vinyl alcohol (EVOH), high-density polyethylene (HDPE), and polypropylene (PP); suitable inorganic materials may be selected from the group consisting of metal oxides, SiOx, SixNy, AlOx. Most preferably, a polymer humidity barrier material contains a material selected from the group of PVdC and COC.

Advantageously, a polymer oxygen barrier material contains a material selected from EVOH polymers.

Suitable barrier films may be present in the form of multilayers. Such barrier films are known in the field and generally comprise a substrate, such as PET with a thickness in the range of 10-200 μm, and a thin inorganic layer comprising materials from the group of SiOx and AlOx or an organic layer based on liquid crystals which are embedded in a polymer matrix or an organic layer with a polymer having the desired barrier properties. Possible polymers for such organic layers comprise for example PVdC, COC, EVOH.

The inventive self-supporting films may be obtained in analogy to known methods using the starting materials of formula (I), formula (ii) and monomers/oligomers of the respective polymer. The invention thus provides for a method of manufacturing a self-supporting film, comprising the steps of (a) combining compound of formula (I), compound of formula (II), monomer and/or oligomer of the polymer, optionally diluent, optionally scattering particles, optionally catalyst or other additives, to thereby obtain a first dispersion;

(b) optionally removing the diluent to thereby obtain an ink;

c) coating said ink on a barrier film to thereby obtain a coated barrier film;

(d) laminating said coated barrier film with a second barrier film (e) curing said laminated barrier films to thereby obtain the inventive self-supporting film;

The inventive manufacturing is simple and can be easily applied to existing production lines.

A third aspect refers to a light emitting device which is preferably a liquid crystal display. The light emitting device comprises a solid polymer composition according to the first aspect of the invention or a self-supporting film according to the second aspect of the invention.

An advantageous embodiment of the light emitting device comprises an array of more than one blue LED, wherein the array of LEDs covers essentially the full liquid crystal display area. In addition, a diffusor plate is arranged between the array of more than one blue LED and the self-supporting film.

In a further advantageous embodiment of the invention, the one or more blue LEDs of the array are each adapted to switch between on and off with a frequency f of f 150 Hz, preferably of f 300 Hz, very preferably of f 600 Hz.

BRIEF DESCRIPTION OF THE DRAWINGS

The invention will be better understood and objects other than those set forth above will become apparent from the following detailed description thereof. Such description makes reference to the annexed drawings, wherein.

MODES FOR CARRYING OUT THE INVENTION

Figure 1:
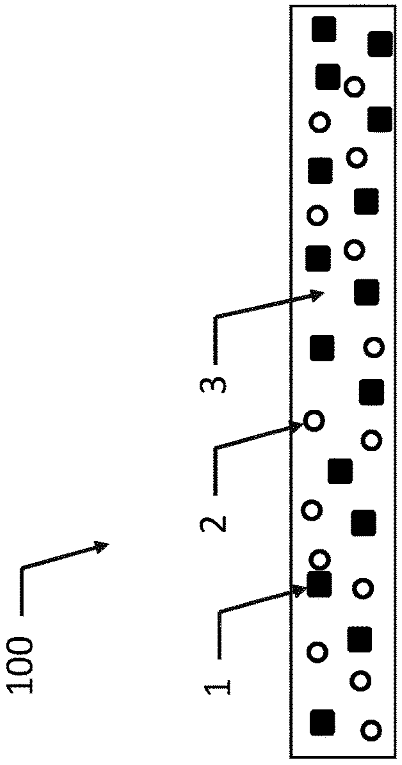
FIG. 1 shows a schematic of a solid polymer composition according to an embodiment of the invention.

Embodiments, examples, experiments representing or leading to embodiments, aspects and advantages of the invention will be better understood from the following detailed description thereof. Such description makes reference to the annexed drawings, wherein:

FIG. 1 shows a schematic of a solid polymer composition 100 according to an embodiment of the first aspect, wherein the solid polymer composition comprises green luminescent perovskite crystals 1 of formula (I), non-perovskite red phosphor crystals 2 of formula (II), and a polymer 3. The polymer has a molar ratio of the sum of (oxygen+nitrogen) to carbon z, wherein $z \leq 0.9$, $z \leq 0.75$ in particular $z \leq 0.4$, in particular $z \leq 0.3$, in particular $z \leq 0.25$.

Further embodiments of the solid polymer composition in FIG. 1 might comprise further features according to the first aspect of the invention.

Figure 2:
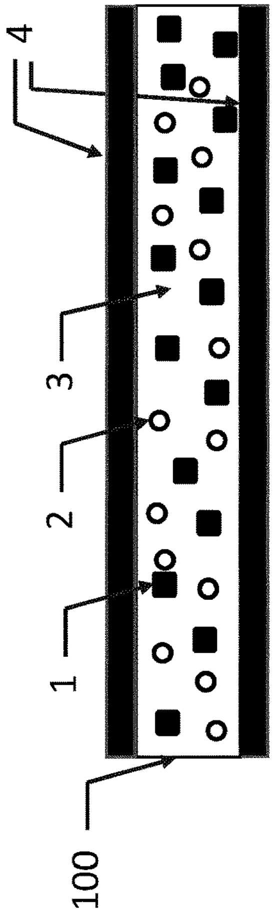
FIG. 2 shows a schematic of a sheet-like material according to an embodiment of the invention.

FIG. 2 shows a schematic of an embodiment of a self-supporting film according to the second aspect of the invention. In an advantageous embodiment as demonstrated in the figure, the self-supporting film might comprise barrier layers 4 that sandwich the solid polymer composition 100.

Figure 3:
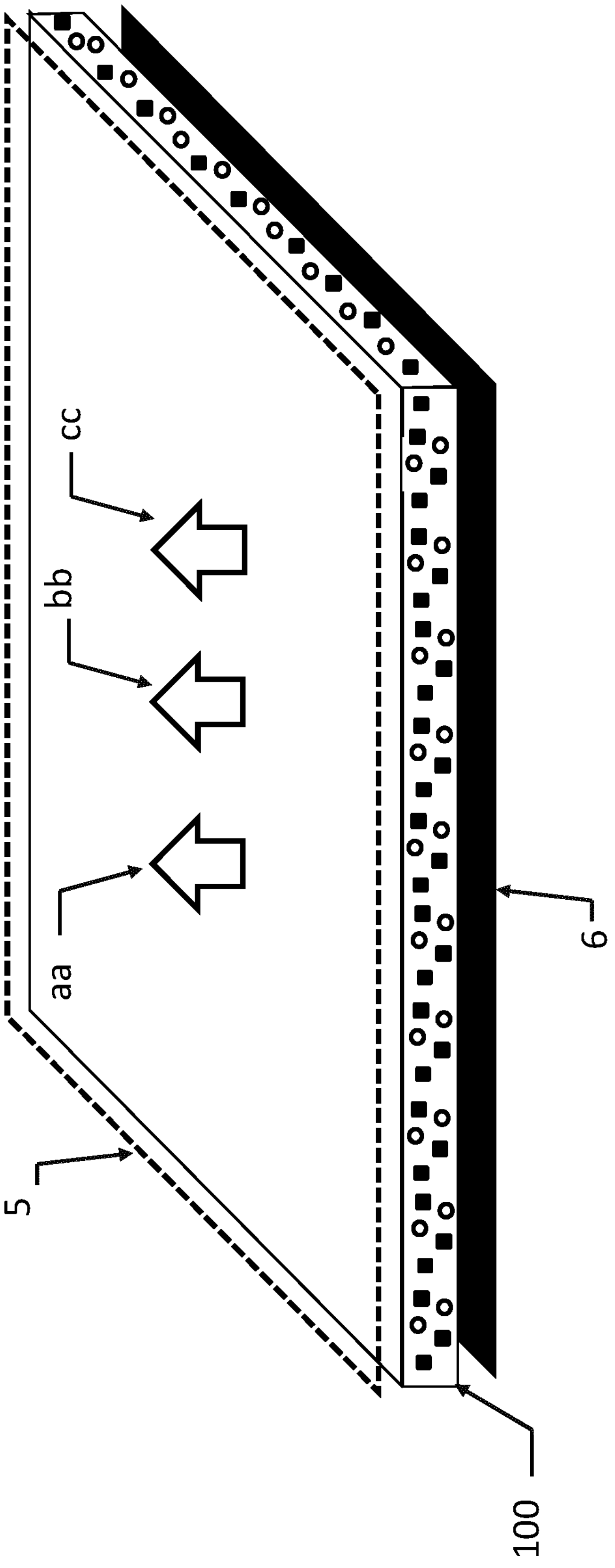
FIG. 3 shows a light emitting device according to an embodiment of the invention.

FIG. 3 shows a schematic of an embodiment of a light emitting device, in particular a liquid crystal display (LCD) according to the third aspect of the invention. Advantageously, the light emitting device comprises a solid polymer composition 100 as shown in FIG. 1 or a self-supporting film as shown in FIG. 2. Advantageously, the light emitting device comprises more than one blue LED 6, wherein the LEDs covers essentially the full liquid crystal display area 5. In particular, a diffusor plate is arranged between the array of more than one blue LED and the self-supporting film (the diffusor plate is not shown in the figure).

EXPERIMENTAL SECTION

Example 1: Preparation of a Self-Supporting Film Comprising a Solid Polymer Composition as Described Herein Green perovskite QDs ($FAPbBr_3$): Formamidinium lead tribromide ($FAPbBr_3$) was synthesized by milling $PbBr_2$ and FABr. Namely, 16 mmol $PbBr_2$ (5.87 g, 98% ABCR, Karlsruhe (DE)) and 16 mmol FABr (2.00 g, Greatcell Solar Materials, Queanbeyan, (AU)) were milled with Yttrium stabilized zirconia beads (5 mm diameter) for 6 h to obtain pure cubic $FAPbBr_3$, confirmed by XRD. The orange $FAPbBr_3$ powder was added to Oleylamine (80-90, Acros Organics, Geel (BE)) (weight ratio $FAPbBr_3$:Oleylamine=100:15) and toluene (>99.5%, puriss, Sigma Aldrich). The final concentration of $FAPbBr_3$ was 1 wt %. The mixture was then dispersed by ball milling using yttrium stabilized zirconia beads with a diameter size of 200 μm at ambient conditions (if not otherwise defined, the atmospheric conditions for all experiments are: 35° C., 1 atm, in air) for a period of 1 h yielding an ink with green luminescence.

Film formation: 0.1 g of the green ink was mixed with an UV curable monomer/crosslinker mixture (0.7 g FA-513AS, Hitachi Chemical, Japan/0.3 g Miramer M240, Miwon, Korea) containing 1 wt % photoinitiator Diphenyl(2,4,6-trimethylbenzoyl) phosphine oxide (TCI Europe, Netherlands) and 2 wt % polymeric scattering particles (Organopolysiloxane, ShinEtsu, KMP-590) and 10 wt % non-perovskite red phosphor particles ("KSF", $K_2SiF_6:Mn^{4+}$), commercially available in solid form, in a speed mixer and the toluene was evaporated by vacuum (<0.01 mbar) at room temperature.

The non-perovksite red phosphor particles $K_2SiF_6:Mn^{4+}$ were manufactured by state of the art methods. Such particles are known to have sizes with a diameter of typically 2-50 μm.

The particles are e.g. manufactured by the method disclosed in Sijbom H. F. et al. ICP-MS showed that the resulting KSF particles had a Mn-concentration of 1.5 mol %. SEM analysis with EDX-mapping of Mn further showed that the Mn is distributed homogeneously within the KSF particles from particle core to particle surface proving that the KSF particles are free of an inorganic shell or any other encapsulation.

The volume-weighted average KSF particle size was 3 μm as determined by SEM.

The resulting mixture was then coated with 50 micron layer thickness on a 100 micron barrier film (supplier: I-components (Korea); Product: TBF-1007), then laminated with a second barrier film of the same type. Afterwards the laminate structure was UV-cured for 60 s (UVAcube100 equipped with a mercury lamp and quartz filter, Hoenle, Germany) to thereby obtain a self-supporting film wherein the inventive solid polymer composition is sandwiched between two barrier layers. The resulting KSF quantity per film area was around 6 g/m2.

Performance Tests: The initial performance of the as obtained film showed a green emission wavelength of 526 nm with a FWHM of 22 nm and a red emission wavelength characteristic for $K_2SiF_6:Mn_{4+}$. The color coordinates (CIE1931) of the film were x=0.23 and y=0.20 when placed on a blue LED light source (450 nm emission wavelength) with two crossed prism sheets (X-BEF) and one brightness enhancement film (DBEF) on top of the QD film (optical properties measured with a Konica Minolta CS-2000).

The glass transition temperature Tg of the UV-cured solid polymer composition was determined by DSC according to DIN EN ISO 11357-2:2014-07 with a starting temperature of −90° C. and an end temperature of 250° C. and a heating rate of 20 K/min in nitrogen atmosphere (20 ml/min). The purging gas was nitrogen (5.0) at 20 ml/min. The DSC system DSC 204 F1 Phoenix (Netzsch) was used. The $T_g$ was determined on the second heating cycle (the first heating from −90° C. to 250° C. showed overlaying effects besides the glass transition). For the DSC measurement the solid polymer composition was removed from the film by delaminating the barrier films. The measured Tg of the UV-cured resin composition was 75° C.

The stability of the film was tested for 150 hours under blue LED light irradiation by placing the film into a light box with high blue intensity (supplier: Hoenle; model: LED CUBE 100 IC) with a blue flux on the film of 410 mW/cm$^2$ at a film temperature of 50° C. Furthermore the film was also tested for 150 hours in a climate chamber with 60° C. and 90% relative humidity. The change of optical parameters after stability testing of the film for was measured with the same procedure as for measuring the initial performance (described above). The change of optical parameters were as following:

| test condition | x-value (—) | y-value (—) | Luminanance (%) |
|---|---|---|---|
| initial | 0.23 | 0.20 | 100% |
| 150 h high flux (410 mW/cm$^2$) | 0.23 | 0.19 | 95% |
| 150 h 60° C./90% r.H. | 0.23 | 0.19 | 93% |

Example 2: Preparation of a Self-Supporting Film Comprising a Solid Polymer Composition with a Large KSF Particle Size KSF particles with a volume-weighted average particle size of 20 μm (measured by SEM) were synthesized similar to the procedure in experiment 1. ICP-MS showed that the resulting KSF particles had a Mn-concentration of 1.6 mol %. SEM analysis with EDX-mapping of Mn further showed that the Mn is distributed homogeneously within the KSF particles from particle core to particle surface indicating that the KSF particles are free of an inorganic shell or any other encapsulation. These KSF particles were used to prepare a film with the same materials (perovskite crystals, monomer/crosslinker mixture, photoinitiator, scattering particles) and the same color coordinates as in example 1. In order to achieve the same film color coordinates as in example 1, the KSF concentration had to be increased from 10 wt % (as in example 1) to 25 wt %. This resulted in a KSF quantity per film area of around 15 $g/m^2$. This shows that a KSF particle size of 3 μm is preferred compared to 20 μm because the KSF quantity per film area is 2.5 times lower, therefore less KSF particles are needed per film area and ultimately less KSF particles are needed e.g. for a display comprising the film.

CONCLUSION

These results show that a self-supporting luminescent film could be obtained whereby the green provskite crystals and non-perovskite red phosphor particles ($K_2SiF_6$:$Mn_{4+}$) both show a good chemical compatibility and high stability when tested under high blue flux and high temperature/humidity. Furthermore these results also show that a small KSF particle size is preferred.

The invention claimed is:

1. A solid polymer composition comprising green luminescent perovskite crystals of formula $FAPbBr_3$, non-perovskite red phosphor particles of formula $K_2SiF_6$:$Mn^{4+}$, scattering particles, and an acrylate polymer, wherein the acrylate polymer has a molar ratio of the sum of (oxygen+nitrogen) to carbon z, wherein z≤0.4, wherein the scattering particles selected from the group consisting of metal oxide particles and polymer particles, and wherein the non-perovskite red phosphor particles have a volume-weighted average particle size $s_p$ of 1 μm-5 μm, wherein the green luminescent perovskite crystals and the non-perovksite red phosphor particles are embedded in the acrylate polymer, and wherein the green luminescent perovskite crystals are free of encapsulation and wherein the non-perovksite red phosphor particles are free of encapsulation.

2. The solid polymer composition according to claim 1, wherein a difference in concentration $\Delta c_{Mn}$ of Mn between the center of each non-perovskite red phosphor particle and an area 100 nm below the respective red phosphor particle surface is $\Delta c_{Mn} \leq 50\%$.

3. The solid polymer composition according to claim 1, wherein the concentration $c_{Mn}$ of Mn in each non-perovskite red phosphor particle is essentially homogenously over the volume of the respective non-perovskite red phosphor particle.

4. The solid polymer composition according to claim 1 wherein the non-perovskite red phosphor particles are free of an inorganic surface coating.

5. The solid polymer composition according to claim 1 wherein the non-perovskite red phosphor particles have a Mn-concentration $c_{Mn}$ of $c_{Mn} \geq 6$ mol %.

6. The solid polymer composition according to claim 1, wherein the polymer comprises an acrylate.

7. The solid polymer composition according to claim 1, wherein the solid polymer composition has a glass transition temperature $T_g$ of $T_g \leq 120°$ C.

8. The solid polymer composition according to claim 1 wherein the non-perovskite red phosphor particles have a Mn-concentration $c_{Mn}$ of $c_{Mn} \geq 9$ mol %.

9. The solid polymer composition according to claim 1, wherein the polymer comprises a cyclic aliphatic acrylate.

10. The solid polymer composition according to claim 1, wherein the solid polymer composition has a glass transition temperature $T_g$ of $T_g \leq 100°$ C.

11. The solid polymer composition according to claim 1, wherein the solid polymer composition comprises scattering particles selected from the group consisting of $TiO_2$, $ZrO_2$, $Al_2O_3$ and organopolysiloxanes.

12. A self-supporting film comprising a solid polymer composition according to claim 1.

13. The self-supporting film according to claim 12, wherein the solid polymer composition is sandwiched between two barrier layers.

14. A light emitting device, in particular a liquid crystal display (LCD), comprising a solid polymer composition according to claim 1.

15. The light emitting device according to claim 14 comprising an array of more than one blue LED, wherein the array of LEDs covers essentially the full liquid crystal display area, and wherein a diffusor plate is arranged between the array of more than one blue LED and the self-supporting film.

* * * * *